(12) United States Patent
Shim et al.

(10) Patent No.: US 8,755,461 B2
(45) Date of Patent: Jun. 17, 2014

(54) LOCAL WIRELESS SIGNAL TRANSMITTING/RECEIVING APPARATUS AND METHOD USING DIGITAL RADIO FREQUENCY PROCESSING TECHNOLOGY

(75) Inventors: Woo Jin Shim, Seoul (KR); Young Woo Kim, Seongnam-si (KR); Jae Hwang Yu, Seoul (KR); Sung Cheol Hong, Seoul (KR); Se Hyun Oh, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 508 days.

(21) Appl. No.: 12/994,799

(22) PCT Filed: May 19, 2009

(86) PCT No.: PCT/KR2009/002643
§ 371 (c)(1),
(2), (4) Date: Nov. 26, 2010

(87) PCT Pub. No.: WO2009/145516
PCT Pub. Date: Dec. 3, 2009

(65) Prior Publication Data
US 2011/0075763 A1    Mar. 31, 2011

(30) Foreign Application Priority Data

| | | |
|---|---|---|
| May 29, 2008 | (KR) | 10-2008-0050483 |
| Jun. 4, 2008 | (KR) | 10-2008-0052802 |
| Apr. 27, 2009 | (KR) | 10-2009-0036754 |
| Apr. 27, 2009 | (KR) | 10-2009-0036756 |

(51) Int. Cl.
*H04L 27/14* (2006.01)
*H04B 1/16* (2006.01)

(52) U.S. Cl.
USPC .......................................... 375/316; 455/214

(58) Field of Classification Search
CPC ............... H04B 1/1018; H04B 1/1036; H04L 27/2334; H04L 27/2337
USPC ......... 375/224, 247, 316, 320, 322, 344, 345; 455/130, 131, 192.1, 192.2, 205, 207, 455/214, 226.1, 234.1, 234.2, 245.2, 248.1, 455/253.2
See application file for complete search history.

(56) References Cited

U.S. PATENT DOCUMENTS

| | | | | |
|---|---|---|---|---|
| 4,295,140 A | * | 10/1981 | Frosch et al. | 342/363 |
| 4,430,747 A | * | 2/1984 | Streeter | 381/15 |
| 4,622,557 A | * | 11/1986 | Westerfield | 342/357.48 |
| 6,671,334 B1 | * | 12/2003 | Kuntz et al. | 375/340 |
| 6,774,822 B1 | * | 8/2004 | Thomson | 341/61 |
| 2004/0160286 A1 | * | 8/2004 | Ward et al. | 331/185 |

* cited by examiner

*Primary Examiner* — Young T. Tse
(74) *Attorney, Agent, or Firm* — Lowe Hauptman & Ham, LLP

(57) ABSTRACT

A local wireless signal receiving apparatus using digital RF processing technology including: a receiving digital RF processor receiving an RF signal and detecting an IF signal from the received RF signal; a zero-crossing signal detector detecting a zero-crossing signal from the detected IF signal, and converting the detected zero-crossing signal into a digital signal; and a receiving signal processor converting the digital signal into a local wireless signal.

6 Claims, 7 Drawing Sheets

LOCAL WIRELESS SIGNAL TRANSMITTING/RECEIVING APPARATUS AND METHOD USING DIGITAL RADIO FREQUENCY PROCESSING TECHNOLOGY

CROSS REFERENCE TO RELATED APPLICATION

This application claims the priority of Korean Patent Application No. 10-2008-0050483, 10-2008-0052802, 10-2009-0036754, and 10-2009-0036756, respectively filed on May 29, 2008, Jun. 4, 2008, Apr. 27, 2009, and Apr. 27, 2009 in the KIPO (Korean Intellectual Property Office), the disclosure of which are incorporated herein in their entirety by reference. Further, this application is the National Phase application of International Application No. PCT/KR2009/002643, filed May 19, 2009, which designates the United States and was published in English. Each of these applications is hereby incorporated by reference in their entirety into the present application.

BACKGROUND OF THE INVENTION

1. Field of the Invention

The present invention relates to a local wireless signal transmitting/receiving technique using digital radio frequency (RF) processing, and more particularly, to a local wireless signal transmitting/receiving apparatus and method using digital RF processing technology, applied to a transmitting/receiving system for local wireless communication to convert a local wireless signal to be transmitted into an RF signal through digital RF processing, transmit the RF signal, detect an intermediate frequency (IF) signal from an external RF signal, convert the detected IF signal into a digital signal, and then convert the digital signal into a processable local wireless signal.

2. Background of the Related Art

Wireless communications capable of replacing wired communications have been developed and local wireless communication such as Bluetooth, Zigbee, ultra wide band (UWB), and infrared data association (IrDA) among the wireless communications is actively developed.

The local wireless communication has low power consumption and makes it possible to implement inexpensive products, distinguished from general wireless communication, and thus the local wireless communication comes into the spotlight as the best solution to various low-speed local communication such as intelligent home network, building and industrial equipment automation, distribution, environment monitoring, human interface, telematics and military administration and ubiquitous networking environments.

Accordingly, devices connected to a local wireless communication system transmit/receive local wireless signals using RF signals, in general. Thus, the devices require transmitting/receiving devices for local wireless signals and AD/DA converters for converting RF signals corresponding to analog signals into digital signals.

However, when AD/DA converters are mounted in an RF signal transmitting/receiving apparatus, the power consumption and volume of the RF signal transmitting/receiving apparatus increase.

Since most small-size devices including cellular phones have been developed to achieve miniaturization and low power consumption design in recent years, a technique of minimizing the number of components of a transmitting/receiving device included in the small-size devices to decrease the volume and power consumption of the transmitting/receiving device is required.

SUMMARY OF THE INVENTION

Accordingly, the present invention has been made in view of the above-mentioned problems occurring in the prior art, and it is a primary object of the present invention to provide a local wireless signal transmitting/receiving apparatus and method using digital RF processing technology, which converts a local wireless signal into an RF signal, transmits the RF signal, detects a single-bit IF signal from an external RF signal, converts the IF signal into a local wireless signal and processes the local wireless signal without using AD/DA converters.

It is another object of the present invention to provide a local wireless signal transmitting/receiving apparatus using digital RF processing technology, which replaces AD/DA converters with a zero-crossing detector (ZXD) and a polarity modulator.

To accomplish the above objects of the present invention, according to the present invention, there is provided a local wireless signal transmitting apparatus using digital RF processing technology, which comprises a phase converter converting a sinusoidal pulse offset QPSK signal into MSK phase information, and a digital RF processor directly converting the MSK phase information into an RF signal through polar modulation, power-amplifying the RF signal and transmitting the amplified RF signal.

The sinusoidal pulse offset QPSK signal may be a Zigbee signal.

The power amplification may be performed using a switching mode power amplifier.

The digital RF processor may comprise a polar modulator, a digitally controlled oscillator (DCO) and a digitally controlled power amplifier (DPA). The polar modulator may receive the MSK phase information from the phase converter and modulate the phase of the DCO to generate an RF signal. The RF signal may be applied to the DPA and power-amplified.

Parts of the RF signal generated by modulating the phase of the DCO by the polar modulator may be applied to a time-to-digital converter and fed back to the polar modulator.

The DPA may be a switching mode power amplifier.

The phase of the DCO may be controlled by tuning digitally controlled low-capacity capacitors.

The MSK phase information may be modulated through sigma-delta modulation.

The digital RF processor may comprise a polar modulator, a DCO and a DPA. The polar modulator may receive the MSK phase information from the phase converter and modulate the phase of the DCO to generate an RF signal. The RF signal may be applied to the DPA and power-amplified. An amplitude control signal of the polar modulator controls the output power of the DPA.

The output power of the DPA may be controlled in the first chip period and a chip extension period of a chip sequence.

The output power of the DPA may be controlled with sinusoidal weighting.

Parts of the RF signal generated by modulating the phase of the DCO by the polar modulator may b applied to a time-to-digital converter and fed back to the polar modulator.

The DPA may be a switching mode power amplifier.

The phase of the DCO may b controlled by tuning digitally controlled low-capacity capacitors.

The MSK phase information may b modulated through sigma-delta modulation.

According to the present invention, there is also provided a local wireless signal transmitting method using digital RF processing technology, which comprises a step in which a local wireless signal transmitting apparatus generates a sinusoidal pulse offset QPSK signal and converts the sinusoidal pulse offset QPSK signal into MSK phase information, and a step in which the local wireless signal transmitting apparatus directly converts the MSK phase information into an RF signal through polar modulation, power-amplifies the RF signal and transmits the amplified RF signal.

According to the present invention, there is provided a local wireless signal receiving apparatus using digital RF processing technology, which comprises a receiving digital RF processor receiving an external RF signal and detecting an IF signal from the RF signal, a zero-crossing signal detector detecting a zero-crossing signal from the IF signal received from the receiving digital RF processor, and converting the zero-crossing signal into a digital signal, and a receiving signal processor converting the digital signal received from the zero-crossing signal detector into a processable local wireless signal.

The zero-crossing signal detector may b one of a selecting zero-crossing signal detector or an averaging zero-crossing signal detector.

The IF signal may be a single bit.

The receiving digital RF processor may filter the RF signal to remove a first decimation factor from the RF signal and detect the IF signal from the RF signal.

The receiving digital RF processor may filter the IF signal to remove a second decimation factor, filter the filtered IF signal to remove a third decimation factor, and then detect the domain of the IF signal.

When the domains of IF signals are received from the receiving digital RF processor, the zero-crossing signal detector may detect a time difference between the domains of the IF signals to detect the zero-crossing signal and convert the zero-crossing signal into a digital signal.

The receiving signal processor may convert the digital signal received from the zero-crossing signal detector into the local wireless signal and output the local wireless signal to a physical protocol data unit (PPDU).

According to the present invention, there is also provided a local wireless signal receiving method using digital RF processing technology, which comprises a step in which a local wireless signal receiving apparatus detects an IF signal from an external RF signal, a step in which the local wireless signal receiving apparatus detects a zero-crossing signal from the IF signal and converts the zero-crossing signal into a digital signal, and a step in which the local wireless signal receiving apparatus converts the digital signal into a processable local wireless signal.

As described above, the present invention can replace a DA converter with a polar modulator so as to convert a local wireless signal into an RF signal and transmit the RF signal. Furthermore, the present invention can make it possible to implement a low-power design for a local wireless signal transmitting apparatus, reduce the chip size of the local wireless signal transmitting apparatus and save costs.

Moreover, the present invention can replace an AD converter with a ZXD so as to detect a single-bit IF signal from an external RF signal, convert the IF signal into a local wireless signal and process the local wireless signal. In addition, the present invention can make it possible to implement a low-power design for a local wireless signal receiving apparatus, reduce the chip size of the local wireless signal receiving apparatus and save costs.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Although a local wireless signal transmitting apparatus and a local wireless signal receiving apparatus using digital RF processing technology are separately constructed in embodiments of the present invention, the present invention is not limited thereto and the local wireless signal transmitting apparatus and the local wireless signal receiving apparatus can be combined into a single local wireless signal transmitting/receiving apparatus and mounted in a specific apparatus such as a cellular phone.

Furthermore, the local wireless signal transmitting apparatus and the local wireless signal receiving apparatus disclosed in embodiments of the present invention can be coupled to each other to transmit/receive signals to/from each other.

Local wireless signals used in embodiments of the present invention can be replaced with signals of local wireless communication using communication schemes such as Bluetooth, Zigbee, UWB, IrDA, etc.

Figure 1:
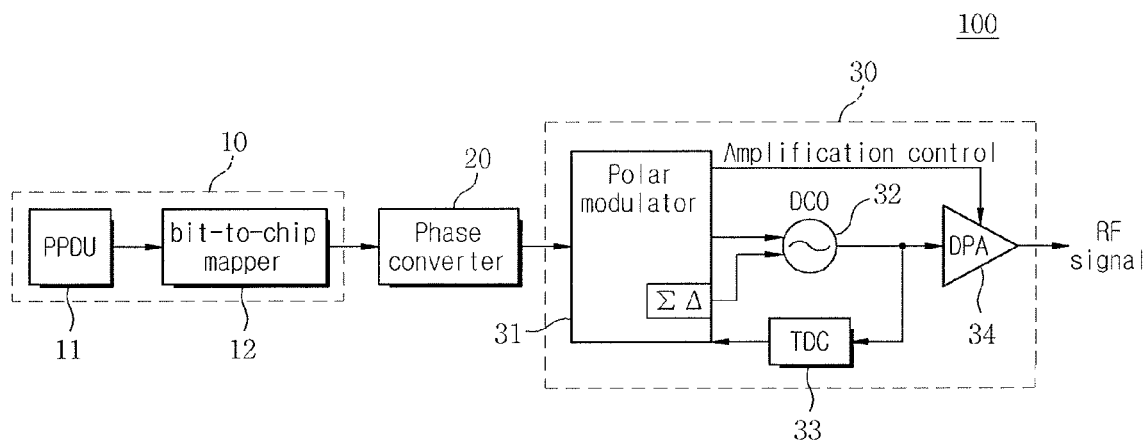
FIG. 1 illustrates a configuration of a local wireless signal transmitting apparatus using digital RF processing technology according to an embodiment of the present invention.

FIG. 1 illustrates a configuration of a signal transmitting apparatus 100 using digital RF processing technology according to an embodiment of the present invention.

Referring to FIG. 1, the signal transmitting apparatus 100 using digital RF processing technology includes a transmitting signal processor 10, a phase converter 20, and a transmitting digital RF processor (referred to as a transmitting DRP) 30.

The transmitting signal processor 10 includes a physical protocol data unit (PPDU) 11 and a bit-to-chip mapper 12.

The PPDU 11 generates a binary wireless data signal (referred to as a local wireless signal hereinafter) in the form of a square wave and outputs the local wireless signal to the bit-to-chip mapper 12.

The bit-to-chip mapper 12 maps the local wireless signal received from the PPDU 11 with 32-chip pseudo-random noise (PN) sequence to spread the frequency of the local wireless signal to thereby generate a baseband signal and transmits the baseband signal to the phase converter 20. Furthermore, the bit-to-chip mapper 12 may map the local wireless signal with 15-chip PN sequence to spread the frequency of the local wireless signal.

The phase converter 20 receives the baseband signal generated by the bit-to-chip mapper 12 and converts the baseband signal into phase information through minimum shift keying (MSK). Here, the phase converter 20 directly converts the baseband signal into the phase information, and thus the quantity of calculations for generating phase information by a polar modulator 31 of the transmitting DRP 30 can be reduced.

MSK is a type of continuous-phase shift keying (CPSK). When two carriers $f_1$ and $f_2$ are selected such that a phase one symbol behind the current phase leads or is delayed by ±90° in CPSK, two codes are in an orthogonal relationship to achieve ideal demodulation. A modulation method that selects carriers such that a minimum frequency difference establishing the orthogonal relationship, that is, $2(f_1-f_2)*T_s = 1$ ($T_s$: symbol timing), is MSK. Here, phase impulse response characteristic $q(\tau)$ of MSK is represented by Equation 1.

$$q(\tau) = \begin{cases} 0 & \text{for } \tau < 0 \\ \tau/(2T_c) & \text{for } 0 \leq \tau \leq T_c \\ 1/2 & \text{for } T_c < \tau \end{cases} \quad \text{[Equation 1]}$$

Here, $T_c$ represents a chip time.

In this manner, the phase shift of the baseband signal $d_m$ generated by the bit-to-chip mapper 12 becomes $d_m*\pi/2$, and thus MSK phase information $\phi(t)$ is represented by Equation 2.

$$\phi(t) = \pi \sum_{m=0}^{M-1} d_m q(t - mT_c) \quad \text{[Equation 2]}$$

The transmitting DRP 30 converts the phase information received from the phase converter 20 into an RF signal using polar modulation.

To achieve this, the transmitting DRP 30 includes the polar modulator 31, a digitally controlled oscillator (DCO) 32, a time-to-digital converter (TDC) 33, and a digitally controlled power amplifier (DPA) 34.

The polar modulator 31 converts the phase information received from the phase converter 20 into an RF signal using polar modulation. Here, the polar modulator 31 may convert the phase information into the RF signal in consideration of the output of the DCO 32. IF the carrier frequency of the local wireless signal is $f_{rf}$, the output $V_o$ of the DCO 32 is represented by Equation 3. In Equation 3, A represents the magnitude of the output voltage of the DCO 32.

$$v_0 = A\sin[2\pi f_{rf} t + \phi(t)] = A\sin 2\pi f_{rf} t + \pi \sum_{m=0}^{M-1} d_m q(t - mT_c), \quad \text{[Equation 3]}$$

$$0 \leq t \leq MT_c$$

The polar modulator 31 may tune multiple low-capacity capacitors into a varactor form when converting the phase information into the RF signal in consideration of the output of the DCO 32 so as to control conversion of the phase information in consideration of the output of the DCO 32. Furthermore, the phase information may be modulated according to sigma-delta modulation to reduce phase noise of the DCO 32.

The polar modulator 31 compares the baseband signal generated by the bit-to-chip mapper 12 with the RF signal converted from the phase information received from the phase converter 20 through modulation, ramps up a period in which the baseband signal and the RF signal increase and ramps down a period in which the baseband signal and the RF signal decrease if errors are generated in the baseband signal and the RF signal. This minimizes an error between a local wireless signal to be transmitted and an RF signal when the local wireless signal is converted into the RF signal and transmitted. A method of minimizing the error between the local wireless signal and the RF signal will be described through equations with reference to FIGS. 2 and 3.

The DCO 32 generates an output signal. Parts of the output signal of the DCO 32 are sampled, time-to-digital converted through the TDC 33, and fed back to the polar modulator 31 to stabilize the output signal of the DCO 32.

The TDC 33 time-to-digital converts the output signal of the DCO 32 and feeds back the converted output signal to the polar modulator 31.

The DPA 34 can amplify the RF signal received from the polar modulator 31 through the DCO 32 and transmit the amplified RF signal when the DPA 34 is a switching mode power amplifier. The DPA 34 can amplify the RF signal according to an amplification control signal received from the polar modulator 31 and transmit the amplified RF signal.

Figure 2:
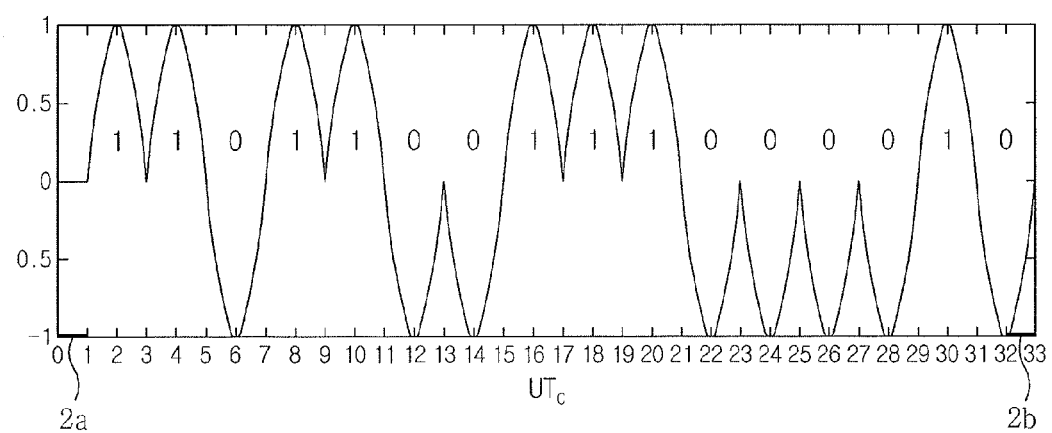
FIG. 2 is a graph showing a baseband signal according to an embodiment of the present invention.
Figure 3:
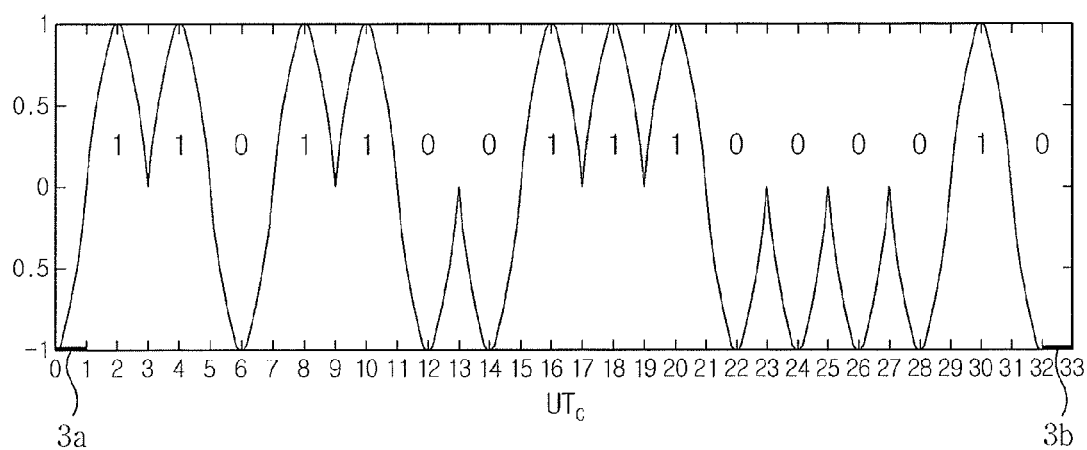
FIG. 3 is a graph showing an RF signal converted from a baseband signal according to an embodiment of the present invention.
Figure 4:
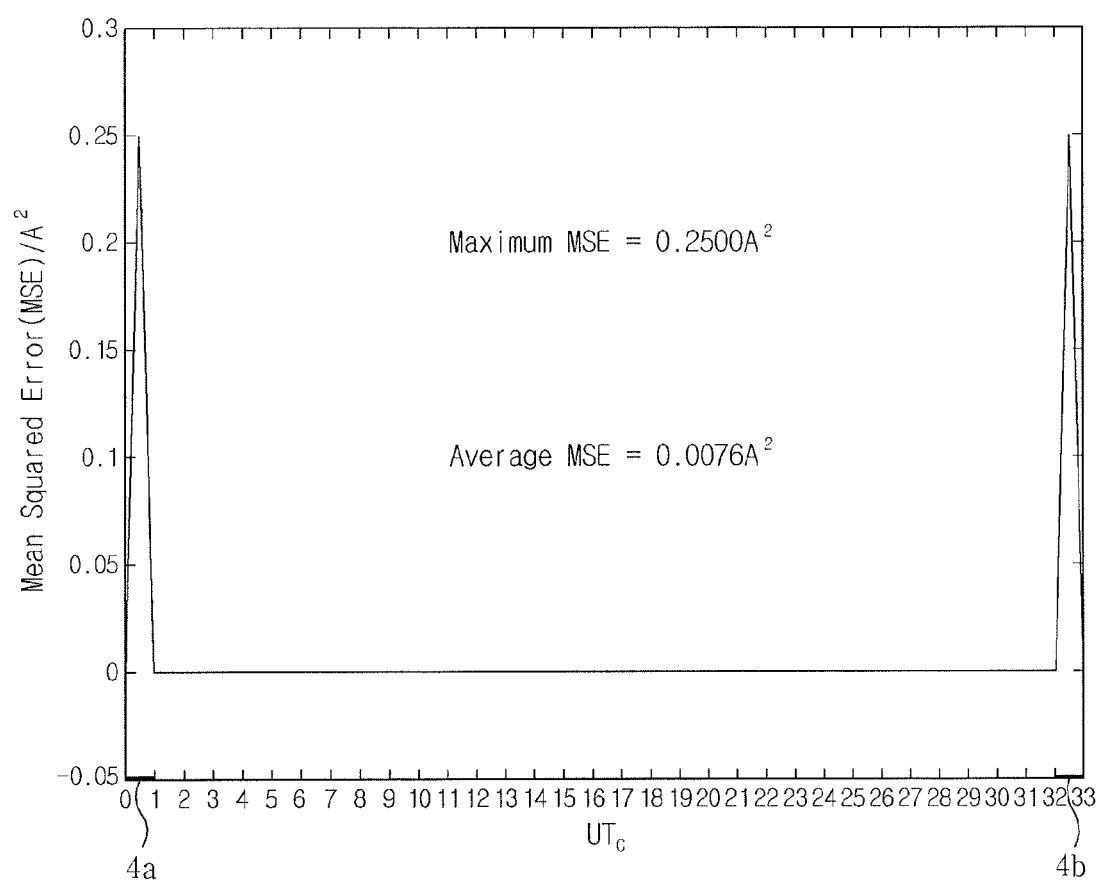
FIG. 4 is a graph showing the mean square error of an error between the signals shown in FIGS. 2 and 3.

FIG. 2 is a graph showing the baseband signal according to the aforementioned embodiment of the present invention, FIG. 3 is a graph showing the RF signal converted from the baseband signal through MSK according to the aforementioned embodiment of the present invention, and FIG. 4 is a graph showing the average square error of an error between the baseband signal and the RF signal respectively shown in FIGS. 2 and 3.

Referring to FIGS. 2, 3 and 4, 2a and 3a represent a period $[0, T_c]$ and 2b and 3b represent a period $[MT_c, (M+1)T_c]$. It can be confirmed from FIGS. 2 and 3 that the baseband signal is correctly converted to the RF signal in a period $[T_c, MT_c]$ other than the periods $[0, T_c]$ and $[MT_c, (M+1)T_c]$ although the baseband signal and the MSK-modulated RF signal have errors in the periods $[0, T_c]$ and $[MT_c, (M+1)T_c]$.

To reduce the errors, the polar modulator 31 controls amplitudes of a period in which the baseband signal and the RF signals rise in a crescendo and a period in which the baseband signal and the RF signal fade out, such as $[0, T_c]$ and $[MT_c, (M+1)T_c]$, using Equations 4 and 5.

In Equation 4, $r_1$ represents the magnitude of the baseband signal $d(t)$ in $[0, T_c]$ and $r_2$ represents the magnitude of the RF signal converted from the baseband signal, d(t), in $[MT_c, (M+1)T_c]$.

$$r_1(t) = A\sin^2\left\{\frac{\pi}{2T_c} \times t\right\}, \quad 0 \le t < T_c \quad \text{[Equation 4]}$$

$$r_2(t) = A\cos^2\left\{\frac{\pi}{2T_c} \times (t - MT_c)\right\}, \quad MT_c < t \le (M+1)T_c \quad \text{[Equation 5]}$$

A correction equation for the RF signal d(t) for setting phase continuity in the entire chip period $[0, (M+1)T_c]$ of the local wireless signal is represented by Equation 6. In Equation 6, $d_0$ and $d_m$ respectively represent 0th and Mth chips.

$$\tilde{d}(t) = A \times \begin{cases} \sin^2\left\{\frac{\pi}{2T_c} \times T\right\}\exp\{j\pi d_0 q(t)\}, & c \le t < T_c \\ \exp\left\{j\pi \sum_{m=0}^{M} d_m q(t - mT_c)\right\}, & T_c \le t \le MT_c \\ \cos^2\left\{\frac{\pi}{2T_c} \times (t - MT_c)\right\} \times \exp\left\{j\frac{\pi}{2}\sum_{m=0}^{M-1} d_m + j\pi d_M q(t - MT_c)\right\}, & MT_c < t \le (M+1)T_c \end{cases} \quad \text{[Equation 6]}$$

As described above, the polar modulator 31 can control the DPA 34 according to the amplification control signal to correct the magnitude of the RF signal d(t) in $[0, T_c]$ and $[MT_c, (M+1)T_c]$ using Equations 4 and 5.

In another method for correcting the magnitude of the RF signal d(t), the DPA 34 may control the output thereof irrespective of control of the polar modulator 31. Furthermore, errors generated in $[0, T_c]$ and $[MT_c, (M+1)T_c]$ can be overcome according to a demodulation algorithm such as robust detection.

It can be confirmed from FIG. 4 that the first chip has a maximum MSE of 0.25 $A^2$ in periods 4a and 4b respectively corresponding to $[0, T_c]$ and $[MT_c, (M+1)T_c]$ and other chips have an average MSE of 0.0076 $A^2$. Accordingly, it can be confirmed that the RF signal almost correctly approximate the baseband signal, and thus the error in the original signal to be transmitted and the error in the signal converted from the original signal to be transmitted almost correspond to each other. Here, an error is calculated as a mean square error.

Figure 5:
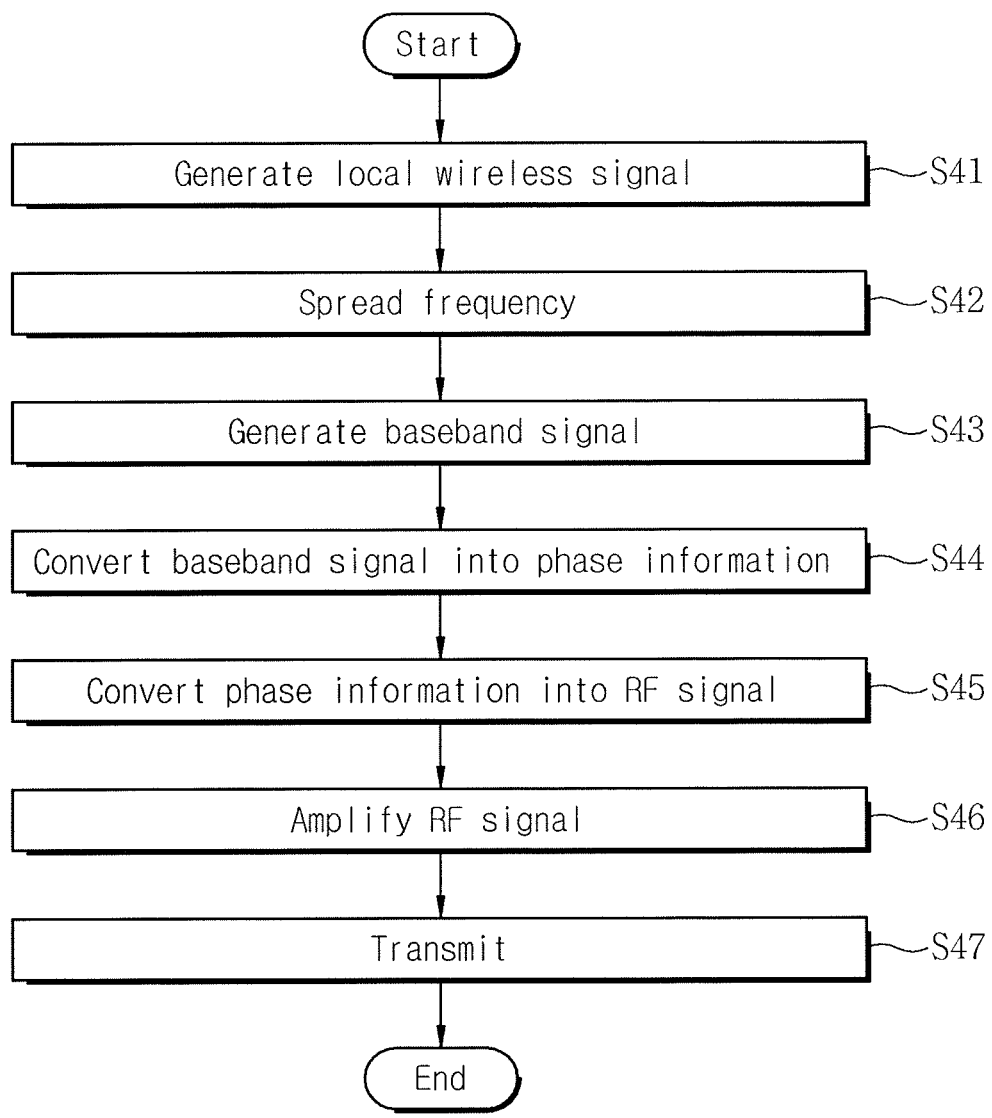
FIG. 5 is a flowchart showing a local wireless signal transmitting method using digital RF processing technology according to an embodiment of the present invention.

FIG. 5 is a flowchart showing a signal transmitting method using digital RF processing technology according to an embodiment of the present invention.

Referring to FIGS. 1 and 5, the PPDU 11 generates a binary local wireless signal in the form of a square wave, which will be transmitted, in operation S41 and transmits the local wireless signal to the bit-to-chip mapper 12.

The bit-to-chip mapper 12 spreads the frequency of the received local wireless signal in operation S42. Here, the bit-to-chip mapper 12 may spread the frequency of the local wireless signal received in a 15-chip PN or 32-chip PN sequence according to physical layer standard of local wireless signals. The bit-to-chip mapper 12 generates a baseband signal from the local wireless signal with the spread frequency in operation S43 and provides the baseband signal to the phase converter 20.

The phase converter 20 converts the baseband signal received from the bit-to-chip mapper 12 into phase information in operation S44 and transmits the phase information to the transmitting DRP 30. Here, the phase converter 20 converts the baseband signal into the phase information using MSK.

The polar modulator 31 of the transmitting DRP 30 directly converts the phase information received from the phase converter 20 into an RF signal using polar modulation in operation S45 and transmits the RF signal to the DPA 34.

Here, the polar modulator 31 can convert the phase information to the RF signal in consideration of the output signal of the DCO 32. To reduce phase noise generated in the output signal of the DCO 32, the TDC 33 may time-to-digital convert the output signal of the DCO 32, which applied to the TDC 33, and feed back the time-to-digital-converted signal to the polar modulator 31.

The DPA 34 amplifies the RF signal provided by the polar modulator 31 according to an amplification control signal received from the polar modulator 31 in operation S46 and transmits the amplified RF signal in operation S47. If the DPA 34 is a switching mode power amplifier, the DPA 34 can amplify the RF signal provided by the polar modulator 31 and transmit the amplified RF signal.

The DPA 34 may be a D/E/F class power amplifier operating in a switching mode to improve power amplification efficiency.

When the transmitting method is applied to Zigbee signal transmission, the output power of an RF signal amplified by the DPA 34 is respectively controlled in the first chip period and a chip extension period of Zigbee chip sequence and the output power of each period is adjusted with sinusoidal weighting. The sinusoidal weighting is represented by Equations 7 and 8.

$$\sin^2\left\{\frac{\pi}{2T_c}t\right\} \quad \text{[Equation 7]}$$

$$\cos^2\left\{\frac{\pi}{2T_c}(t - MT_c)\right\} \quad \text{[Equation 8]}$$

Here, $T_c$ represents a single chip time and M represents the number of chips of Zigbee chip sequence.

Though the phase converter 20 and the transmitting DRP 30 are separated from each other in the current embodiment, the phase converter 20 may be integrated into the polar modulator 31 of the transmitting DRP 30.

Figure 6:
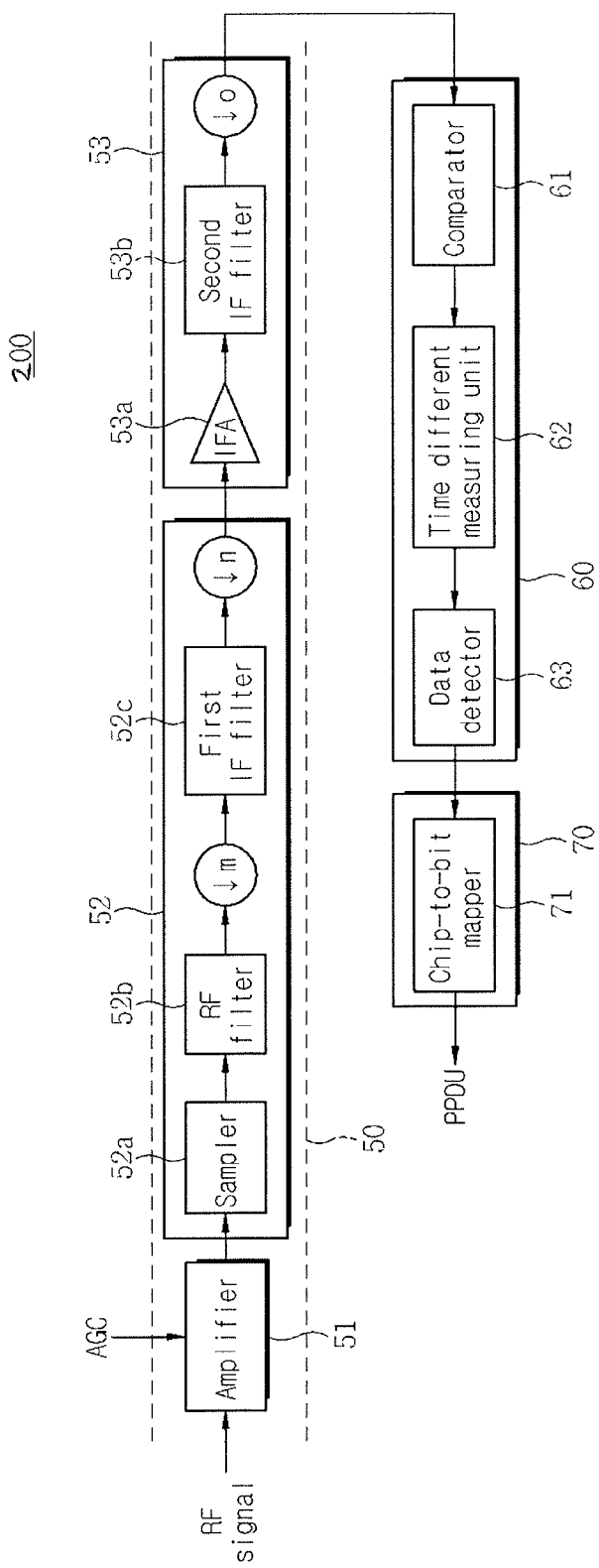
FIG. 6 is a block diagram of a local wireless signal receiving apparatus using digital RF processing technology according to an embodiment of the present invention.

FIG. 6 is a block diagram of a signal receiving apparatus 200 using digital RF processing technology according to an embodiment of the present invention.

Referring to FIG. 6, the signal receiving apparatus 200 using digital RF processing technology includes a receiving digital RF processor (referred to as receiving DRP hereinafter) 50, a zero-crossing detector (ZXD) 60, and a receiving signal processor 70.

More specifically, the receiving DRP 50 includes an amplifier 51, a multi-tap direct sampling mixer (MTDSM) 52, and an intermediate frequency processor (referred to as IF processor hereinafter) 53.

The amplifier 51 includes a low-noise transconductance amplifier (LNA) (not shown) and a transconductance amplifier (TA) (not shown) and amplifies an external RF signal. Particularly, the LNA amplifies a low-noise signal of the RF signal according to an automatic gain control (AGC) signal received from a controller (not shown) of the signal receiving apparatus 200 to detect transconductance. The TA amplifies the transconductance provided by the LNA to generate impedance and outputs the impedance to the MTDSM 52.

The MTDSM 52 removes a decimation factor from the RF signal of the impedance to detect the front-end stage of the analog signal corresponding to the RF signal, detects an IF signal, and then removes a decimation factor from the IF signal.

To achieve this, the MTDSM 52 includes a sampler 52a, an RF filter 52b, and a first IF filter 52c.

The sampler 52a samples the impedance provided by the amplifier 51 and provides the sampled RF signal to the RF filter 52b.

The RF filter 52b, which corresponds to an RF decimation filter, filters the RF signal provided by the sampler 52a, detects a first decimation factor m from the filtered RF signal and removes the first decimation factor m. The RF filter 52b provides the RF signal from which the first decimation factor has been removed to the first IF filter 52c.

The first IF filter 52c, which corresponds to an IF decimation filter, filters the RF signal received from the RF filter 52b to detect an IF signal, detects a second decimation factor n from the IF signal and removes the second decimation factor n. The first IF filter 52c provides the IF signal from which the second decimation factor n has been removed to the IF processor 53.

The IF processor 53 detects domains of IF signals. To achieve this, the IF processor 53 includes an IF amplifier (IFA) 53a and a second IF filter 53b.

The IFA 53a amplifies the IF signal received from the first IF filter 52c and provides the amplified IF signal to the second IF filter 53b.

The second IF filter 53b, which corresponds to an IF decimation filter, filters the IF signal provided by the IFA 53a, detects a third decimation factor o from the filtered IF signal and removes the third decimation factor to detect the back-end stage of the analog signal.

The second IF filter 53b detects the domain of the IF signal using the front-end stage of the analog signal, detected by the RF filter 52b, and the back-end stage of the analog signal, detected by the second IF filter 53b. Here, the IF signal may be a single bit.

The ZXD 60 detects a zero-crossing signal from the domain of the single-bit IF signal provided by the IF processor 53 and converts the zero-crossing signal into a digital signal. The ZXD 60 is a selecting ZXD in the current embodiment. However, the present invention is not limited thereto and the ZXD 60 can be an averaging ZXD.

The ZXD 60 includes a comparator 61, a time difference measuring unit 62, and a data detector 63.

The comparator, which is a 1-bit comparator, continuously receives domains of IF signals from the MTDSM 52 and sequentially or repeatedly compares IF signals according to the domains of the IF signals.

The time difference measuring unit 62 measures a time difference between IF signal domains compared by the comparator 61.

The data detector 63 detects a single-bit zero-crossing signal from the IF signal according to the measured time difference and modulates the zero-crossing signal into a digital signal.

A chip-to-bit mapper 71 of the receiving signal processor 70 receives the digital signal from the data detector 63, converts the digital signal into a local wireless signal and outputs the local wireless signal to a physical protocol data unit (PPDU).

As described above, the present invention generates a single-bit RF signal and a single-bit IF signal and uses the receiving apparatus that changes an AD converter to a 1-bit comparator by using ZXD without using the existing 8-bit resolution. Accordingly, the hardware size and power consumption of the signal receiving apparatus 200 can be reduced.

Figure 7:
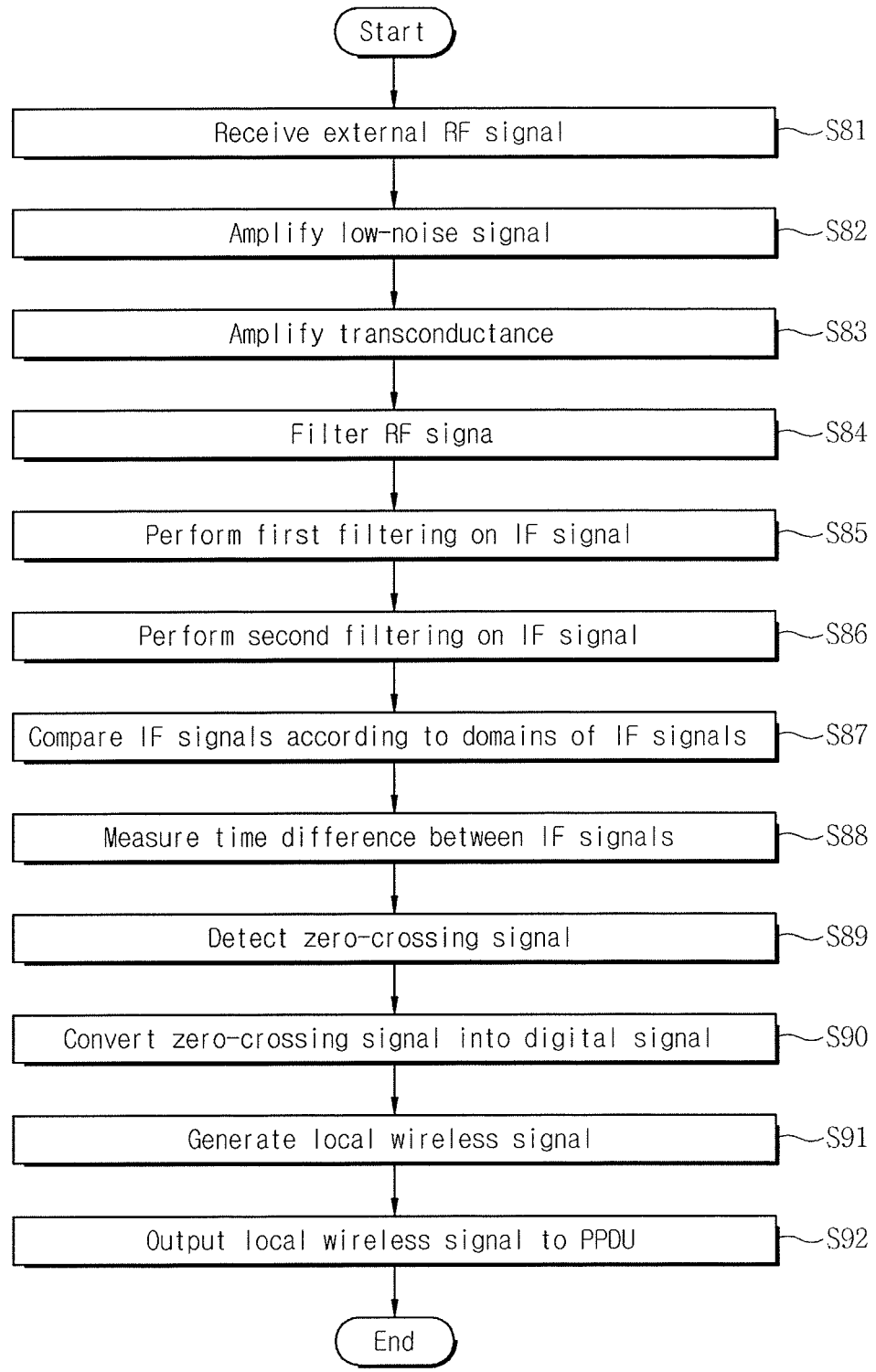
FIG. 7 is a flowchart showing a local wireless signal receiving method using digital RF processing technology according to an embodiment of the present invention.

FIG. 7 is a flowchart showing a signal receiving method using digital RF processing technology according to an embodiment of the present invention.

Referring to FIGS. 6 and 7, the amplifier 51 of the receiving DRP 50 receives an external RF signal in operation S81. The LNA (not shown) included in the amplifier 51 amplifies a low noise signal of the RF signal according to an AGC signal input from the controller (not shown) to detect transconductance in operation S82. The TA (not shown) included in the amplifier 51 amplifies the transconductance detected by the LNA to generate impedance and outputs the impedance to the MTDSM 52 in operation S83.

The sampler 52a of the MTDSM 52 samples the impedance provided by the amplifier 51 in operation S84 and provides the sampled RF signal to the RF filter 52b. The RF filter 52b, which corresponds to an RF decimation factor, filters the RF signal provided by the sampler 52a, detects the first decimation factor m from the filtered RF signal and removes the first decimation factor m. The RF filter 52b removes the first decimation factor m to detect the front-end stage of the analog signal and provides the RF signal from which the first decimation factor m has been removed to the first IF filter 52c.

The first IF filter 52c corresponding to an IF decimation filter filters the RF signal provided by the RF filter 52b to detect an IF signal, detects the second decimation factor n from the IF signal and removes the second decimation factor n. The first IF filter 52c provides the IF signal from which the second decimation factor n has been removed to the IF processor 53 in operation S85.

The IFA 53a amplifies the IF signal received from the first IF filter 52c and provides the amplified IF signal to the second IF filter 53b, and the second IF filter 53b corresponding to an IF decimation filter filters the IF signal provided by the IFA 53a, detects the third decimation factor o from the filtered IF signal and removes the third decimation factor o in operation S86. The second IF filter 53b removes the third decimation factor o to detect the back-end stage of the analog signal.

The second IF filter 53b detects the domain of the IF signal using the front-end state of the analog signal, detected by the RF filter 52b, and the back-end stage of the analog signal, detected by the second IF filter 53b. Here, the IF signal may be a single bit.

The comparator 61 of the ZXD 60 continuously receives the domains of single-bit IF signals from the IF processor 53 and sequentially or repeatedly compares IF signals according to the domains of the IF signals in operation S87.

The time difference measuring unit 62 of the ZXD 60 measures a time difference between IF signals compared by the comparator 61 in operation S88.

The data detector 63 of the ZXD 60 detects a single-bit zero-crossing signal from the IF signal according to the measured time difference in operation S89 and modulates the detected zero-crossing signal into a digital signal in operation S90.

The chip-to-bit mapper 71 of the receiving signal processor 70 receives the digital signal from the data detector 63 and converts the digital signal into a local wireless signal in operation S91. The chip-to-bit mapper 71 outputs the local wireless signal to a PPDU in operation S92.

Figure 8:
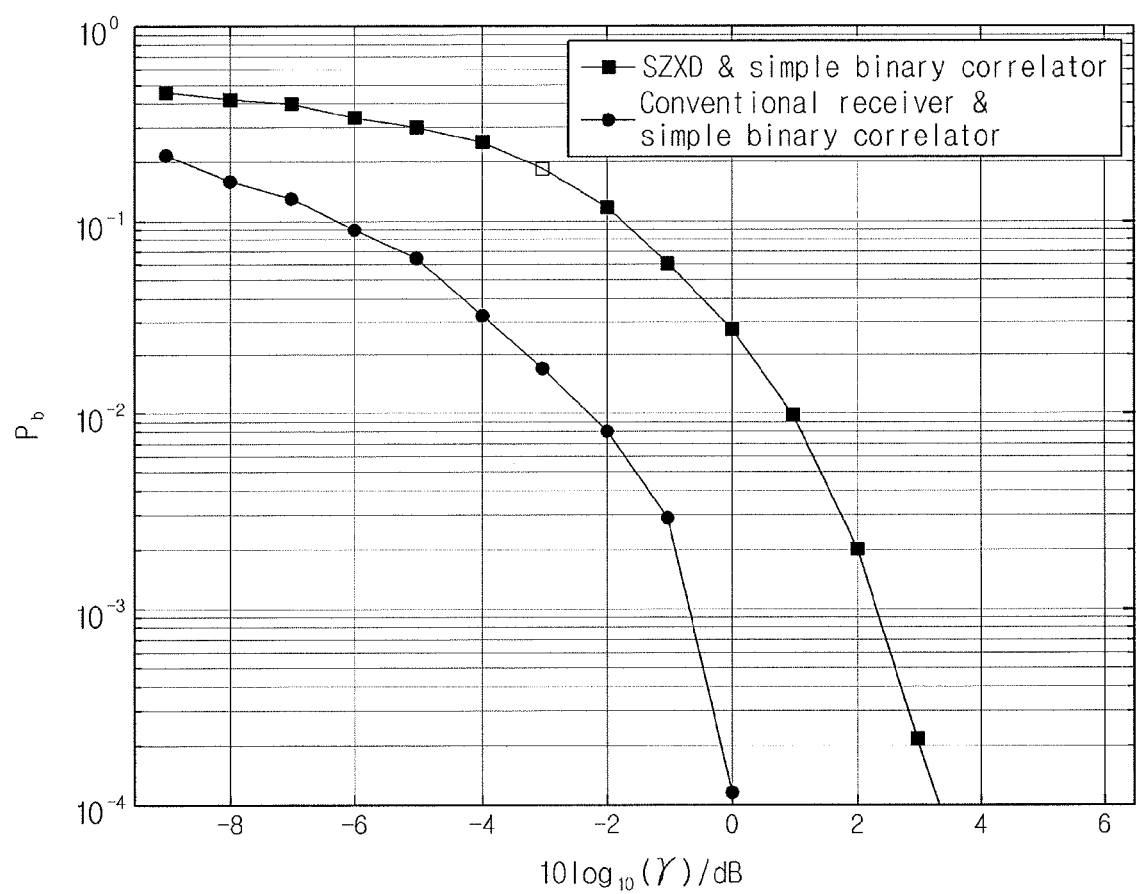
FIG. 8 is a graph showing a simulation result of the local wireless signal receiving apparatus using digital RF processing technology according to an embodiment of the present invention.

FIG. 8 is a graph showing a simulation result of the signal receiving apparatus using digital RF processing technology according to the above embodiment of the present invention.

Referring to FIG. 8, parameters such as RF input frequency, TA transconductivity, MTDSM input impedance, decimation factors M, N and O, and IF signal are required to derive the simulation result.

To derive the simulation result of the present invention, the RF input frequency (RF signal) is set to 2.4 GHz, the TA transconductivity is set to 7.5 ms, and the decimation factors are respectively set to 8 MHz, 6 MHz and 4 MHz in consideration of the IF signal. Here, it is important that a virtual frequency signal is not generated when the IF signal is considered.

An equation for detecting an IF signal from an RF signal is represented by Equation 9.

$$f_{if} = f_{rf} + M \times N \times O \quad \text{[Equation 9]}$$

It can be confirmed from the simulation result that power of about −2.6 dB is required for a conventional receiving apparatus to acquire BER of $10^{-2}$ while power required for the signal receiving apparatus 200 using digital RF processing and zero-crossing technology according to the present invention to acquire BER of $10^{-2}$ is reduced by about 3 dB from the power of the conventional receiving apparatus. However, this does not become a serious problem as compared to advantages obtained by using the signal receiving apparatus 200 using digital RF processing and zero-crossing technology, as shown in Tables 1 and 2.

Table 1 represents advantages with respect to hardware expense and Table 2 represents advantages with respect to power consumption. FIG. 1 shows that hardware expense is reduced about 68% and Table 2 shows that power consumption is decreased about 67%.

TABLE 1

| Receiver Function | Conventional receiver with a simple binary correlator | SZXD & simple binary correlator |
| --- | --- | --- |
| DRP front end | 1 DRP front-end with two branches for inphase and quadrature components ≈101% | 1 DRP front-end with a single branch for the intermediate frequency signal ≈50% |
| Analog-to-digital conversion | 2 analog-to-digital converters(ADCs), having a resolution of minimum 8 bits, operating at 8 MHz each ≈155% | 1 Comparator and a counter operating at 60 MHz~90 MHz ≈0.01% |
| Receiver processing before correlation | Matched filter with two branches and a threshold detector ≈62% | Sample selector ≈50% |
| | ≈318% | 100% |

TABLE 2

| Receiver Function | Conventional receiver with a simple binary correlator | SZXD & simple binary correlator |
| --- | --- | --- |
| DRP front end | ≈104% | ≈52% |
| Analog-to-digital conversion | ≈106% | ≈0.01% |
| Receiver processing before correlation | ≈85% | ≈48% |
| | ≈295% | 100% |

The present invention can be applied to a transmitting/receiving apparatus for transmitting a local wireless signal as an RF signal and receiving an RF signal as a local wireless signal. Furthermore, the present invention can convert a local wireless signal to be transmitted into an RF signal using MSK and digital RF processing, transmit the RF signal, detect an IF signal from an external RF signal, convert the IF signal to a local wireless signal and process the local wireless signal. Accordingly, the chip size of the transmitting/receiving apparatus can be reduced to decrease the hardware expense of the transmitting/receiving apparatus and make it possible to implement a low-power design for the local wireless signal transmitting/receiving apparatus.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A local wireless signal receiving apparatus using digital radio frequency (RF) processing technology, the apparatus comprising:
    a receiving digital RF processor comprising a mixer and an intermediate frequency (IF) processor,
        wherein the mixer includes a first IF filter configured to filter an RF signal, detect a first decimation factor from the filtered RF signal, and remove the first decimation factor to detect a front-end stage of an analog signal corresponding to the RF signal to provide an IF signal, and
        the IF processor includes a second IF filter configured to filter the IF signal, detect a second decimation factor from the filtered IF signal, and remove the second decimation factor to detect a back-end stage of the analog signal to provide a domain of a single-bit IF signal;
    a zero-crossing signal detector comprising a one-bit detector configured to detect a zero-crossing signal of the domain of the single-bit IF signal and convert the detected zero-crossing signal into a single bit zero-crossing signal; and
    a receiving signal processor configured to convert the single bit zero-crossing signal into a local wireless signal.

2. The local wireless signal receiving apparatus of claim 1, wherein the zero-crossing signal detector is one of a selecting zero-crossing signal detector or an averaging zero-crossing signal detector.

3. The local wireless signal receiving apparatus of claim 1, wherein the mixer further includes a digital RF filter configured to filter the RF signal, detect a decimation factor from the filtered RF signal, and remove the decimation factor to provide a filtered RF signal to the first IF filter.

4. The local wireless signal receiving apparatus of claim 1, wherein the zero-crossing signal detector further comprises
a time difference measuring unit configured to measure a time difference between the domain of the single bit IF signal; and
a data detector configured to detect the zero-crossing signal and convert the detected zero-crossing signal into the single bit zero-crossing signal.

5. The local wireless signal receiving apparatus of claim 4, wherein the receiving signal processor is configured to convert the single bit zero-crossing signal into the local wireless signal and output the local wireless signal to a physical protocol data unit (PPDU).

6. A local wireless signal receiving method using digital radio frequency (RF) processing technology, the method performed by a local wireless signal receiving apparatus comprising a receiving digital RF processor including a mixer and an intermediate frequency (IF) processor, and the method comprising:

filtering, by a first IF filter included in the mixer, an RF signal, detecting a first decimation factor from the filtered RF signal, and removing the first decimation factor to detect a front-end stage of an analog signal corresponding to the RF signal to provide an IF signal;

filtering, by a second IF filter included in the IF processor, the IF signal, detecting a second decimation factor from the filtered IF signal, and removing the second decimation factor to detect a back-end stage of the analog signal to provide a domain of a single-bit IF signal;

detecting, by a one-bit detector included in a zero-crossing signal detector, a zero-crossing signal of the domain of the single-bit IF signal and converting the detected zero-crossing signal into a single bit zero-crossing signal; and converting, by a receiving signal processor, the single bit zero-crossing signal into a local wireless signal.

\* \* \* \* \*